United States Patent
Chen et al.

(10) Patent No.: US 9,214,133 B2
(45) Date of Patent: *Dec. 15, 2015

(54) PIXEL STRUCTURE, 2D AND 3D SWITCHABLE DISPLAY DEVICE AND DISPLAY DRIVING METHOD THEREOF

(71) Applicant: AU Optronics Corp., Hsin-Chu (TW)

(72) Inventors: Yi-Ching Chen, Hsin-Chu (TW);
Yu-Sheng Huang, Hsin-Chu (TW);
Chia-Lun Chiang, Hsin-Chu (TW);
Chia-Wei Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 381 days.

This patent is subject to a terminal disclaimer.

(21) Appl. No.: 13/794,848

(22) Filed: Mar. 12, 2013

(65) Prior Publication Data

US 2014/0035968 A1    Feb. 6, 2014

(30) Foreign Application Priority Data

Aug. 3, 2012  (TW) .............................. 101128010 A

(51) Int. Cl.
*G09G 5/10* (2006.01)
*G09G 5/02* (2006.01)
*G09G 3/00* (2006.01)
G09G 3/36 (2006.01)
H04N 13/04 (2006.01)

(52) U.S. Cl.
CPC .................. *G09G 5/02* (2013.01); *G09G 3/003* (2013.01); *G09G 3/3659* (2013.01); *G09G 3/3607* (2013.01); *G09G 2300/0852* (2013.01); *H04N 13/0434* (2013.01); *H04N 13/0452* (2013.01)

(58) Field of Classification Search
CPC .......................... G09G 3/3607; G09G 3/3659
See application file for complete search history.

(56) References Cited

U.S. PATENT DOCUMENTS

| | | | |
|---|---|---|---|
| 2007/0008619 A1* | 1/2007 | Cha et al. | 359/462 |
| 2008/0303768 A1* | 12/2008 | Do et al. | 345/90 |
| 2009/0009508 A1* | 1/2009 | Koo et al. | 345/214 |
| 2009/0027581 A1* | 1/2009 | You et al. | 349/48 |
| 2010/0231614 A1* | 9/2010 | Vieri et al. | 345/690 |
| 2011/0148830 A1 | 6/2011 | Hsu | |
| 2012/0320099 A1 | 12/2012 | Wu | |
| 2013/0044090 A1 | 2/2013 | Wu | |

FOREIGN PATENT DOCUMENTS

| | | |
|---|---|---|
| CN | 101777301 A | 7/2010 |
| CN | 102231256 A | 11/2011 |
| CN | 102436105 A | 5/2012 |
| CN | 102693694 A | 9/2012 |

* cited by examiner

*Primary Examiner* — Carolyn R Edwards
(74) *Attorney, Agent, or Firm* — Winston Hsu; Scott Margo

(57) ABSTRACT

A two-dimension (2D) and three-dimension (3D) switchable display device and display driving method thereof are provided. Each pixel unit of the 2D and 3D switchable display device includes a first sub-pixel, a second sub-pixel and a third sub-pixel. The first sub-pixel, driven by a first gate line, has a first sub-pixel voltage, and the third sub-pixel, driven by a second gate line, has a third sub-pixel voltage different from the first sub-pixel voltage. The charge of the second sub-pixel is shared by a first gate line of an adjacent pixel unit, and the second sub-pixel has a second sub-pixel voltage different from the first sub-pixel voltage and the third sub-pixel voltage. The first sub-pixel, the second sub-pixel and the third sub-pixel of the pixel unit can be driven in a pre-charge driving manner.

11 Claims, 7 Drawing Sheets

PIXEL STRUCTURE, 2D AND 3D SWITCHABLE DISPLAY DEVICE AND DISPLAY DRIVING METHOD THEREOF

BACKGROUND OF THE INVENTION

1. Field of the Invention

The present invention relates to a display device and a display driving method for the display device, and more particularly, to a two-dimension (2D) and three-dimension (3D) switchable display device and a display driving method for the 2D and 3D switchable display device.

2. Description of the Prior Art

Because of the characteristics of compact size, low power consumption and no radiation, liquid crystal monitors have been widely applied to many digital products, for example, notebooks, personal PC monitors and consumer TV applications.

Compared with the conventional cathode ray tube (CRT) monitors, the LCD monitors tend to have brightness variation and contrast variation resulted from different viewing angles, and the LCD monitors even have gray level inversion when the viewing angle is wide. Thus, a bunch of Multi-domain Vertical Alignment (MVA) technologies have been developed in industry to improve the LCD viewing angle problems. However, color washout effect and Gamma curve offset still exists in the MVA LCD monitors when people watch the screen in the 3D display mode from a large viewing angle. Therefore, for a 2D and 3D switchable display device, there are still problems waiting to be solved, such as how to maintain and balance the 2D and 3D switchable display quality, how to solve the color washout effect when watching the screen in the 2D and 3D display mode from a large viewing angle at the same time, how to maintain brightness and saturation, and how to prevent cross talk issues caused by the frames of a left eye and the frames of a right eye.

SUMMARY OF THE INVENTION

It is one of the objectives of the invention to provide a pixel circuit for a two-dimension (2D) and three-dimension (3D) switchable display device, which solves the color washout effect when watching the screen in the 2D and 3D display mode from a large viewing angle at the same time.

It is one of the objectives of the invention to provide a pixel structure for a 2D and 3D switchable display device, which solves the color washout effect when watching the screen in the 2D and 3D display mode from a large viewing angle at the same time.

It is one of the objectives of the invention to provide a 2D and 3D switchable display device, which solves the color washout effect when watching the screen in the 2D and 3D display mode from a large viewing angle at the same time.

An embodiment of the present invention provides a pixel circuit for a 2D and 3D switchable display device. The pixel circuit includes a plurality of pixel units. The pixel units include a first pixel unit and a second pixel unit adjacent to each other. Each of the pixel units includes a data line, a first gate line, a second gate line, a first sub-pixel, a second sub-pixel, a third sub-pixel and a charge sharing unit. The data line is used for transmitting a data signal. The first gate line is used for transmitting a first gate signal. The second gate line is used for transmitting a second gate signal. The first sub-pixel is electrically connected to the data line and the first gate line of the first pixel unit, and a first sub-pixel voltage is written in the first sub-pixel according to the data signal and the first gate signal. The second sub-pixel is electrically connected to the data line and the first gate line of the first pixel unit, and a second sub-pixel voltage is written in the second sub-pixel according to the data signal and the first gate signal. The third sub-pixel is electrically connected to the data line and the second gate line of the first pixel unit, and a third sub-pixel voltage is written in the third sub-pixel according to the data signal of the first pixel unit and the second gate signal transmitted by the second gate line. The charge sharing unit is electrically connected to the second sub-pixel of the first pixel unit and the first gate line of the second pixel unit. The charge sharing unit shares charges with the second sub-pixel of the first pixel unit according to the first gate signal of the first gate line of the second pixel unit so as to make the second sub-pixel voltage different from the first sub-pixel voltage.

Another embodiment of the present invention provides a pixel structure for a 2D and 3D switchable display device. The pixel structure includes a plurality of pixel units. The pixel units include a first pixel unit and a second pixel unit adjacent to each other. Each of the pixel units includes a data line, a first gate line, a second gate line, a first sub-pixel, a second sub-pixel, a third sub-pixel and a charge sharing unit. The data line is used for transmitting a data signal. The first gate line is used for transmitting a first gate signal. The second gate line is used for transmitting a second gate signal. The first sub-pixel includes a first switching element and a first pixel electrode. The first switching element includes a first gate, a first source, and a first drain. The first gate is electrically connected to the first gate line of the first pixel unit, the first source is electrically connected to the data line, and the first drain is electrically connected to the first pixel electrode. The second sub-pixel includes a second switching element and a second pixel electrode. The second switching element includes a second gate, a second source, and a second drain. The second gate is electrically connected to the first gate line of the first pixel unit, the second source is electrically connected to the data line, and the second drain is electrically connected to the second pixel electrode. The third sub-pixel includes a third switching element and a third pixel electrode. The third switching element includes a third gate, a third source, and a third drain. The third gate is electrically connected to the second gate line of the first pixel unit, the third source is electrically connected to the data line, and the third drain is electrically connected to the third pixel electrode. The charge sharing unit is electrically connected to the first gate line of the second pixel unit and the second drain of the second switching element of the second sub-pixel of the first pixel unit.

Another embodiment of the present invention provides a 2D and 3D switchable display device. The 2D and 3D switchable display device includes a display panel and a patterned phase retarding device. The display panel includes a plurality of pixel units. The pixel units include a first pixel unit and a second pixel unit adjacent to each other. Each of the pixel units includes a data line, a first gate line, a second gate line, a first sub-pixel, a second sub-pixel, a third sub-pixel and a charge sharing unit. The data line is used for transmitting a data signal. The first gate line is used for transmitting a first gate signal. The second gate line is used for transmitting a second gate signal. The first sub-pixel includes a first switching element and a first pixel electrode. The first switching element includes a first gate, a first source, and a first drain. The first gate is electrically connected to the first gate line of the first pixel unit, the first source is electrically connected to the data line, and the first drain is electrically connected to the first pixel electrode. The second sub-pixel includes a second switching element and a second pixel electrode. The second switching element includes a second gate, a second source, and a second drain. The second gate is electrically connected to the first gate line of the first pixel unit, the second source is electrically connected to the data line, and the second drain is electrically connected to the second pixel electrode. The third sub-pixel includes a third switching element and a third pixel electrode. The third switching element includes a third gate, a third source, and a third drain. The third gate is electrically connected to the second gate line of the first pixel unit, the third source is electrically connected to the data line, and the third drain is electrically connected to the third pixel electrode. The charge sharing unit is electrically connected to the first gate line of the second pixel unit and the second drain of the second switching element of the second sub-pixel of the first pixel unit. The patterned phase retarding device is disposed on the display panel. The patterned phase retarding device includes a first phase retardation pattern and a second phase retardation pattern. The first phase retardation pattern corresponds to the first pixel unit, and the second phase retardation pattern corresponds to the second pixel unit.

Another embodiment of the present invention provides a display driving method for a 2D and 3D switchable display device. The 2D and 3D switchable display device includes a display panel and a patterned phase retarding device. The display panel includes a plurality of pixel units. The pixel units include a first pixel unit and a second pixel unit adjacent to each other. Each of the pixel units includes a data line, a first gate line, a second gate line, a first sub-pixel, a second sub-pixel, a third sub-pixel and a charge sharing unit. The data line is used for transmitting a data signal. The first gate line is used for transmitting a first gate signal. The second gate line is used for transmitting a second gate signal. The first sub-pixel includes a first switching element and a first pixel electrode. The first switching element includes a first gate, a first source, and a first drain. The first gate is electrically connected to the first gate line of the first pixel unit, the first source is electrically connected to the data line, and the first drain is electrically connected to the first pixel electrode. The second sub-pixel includes a second switching element and a second pixel electrode. The second switching element includes a second gate, a second source, and a second drain. The second gate is electrically connected to the first gate line of the first pixel unit, the second source is electrically connected to the data line, and the second drain is electrically connected to the second pixel electrode. The third sub-pixel includes a third switching element and a third pixel electrode. The third switching element includes a third gate, a third source, and a third drain. The third gate is electrically connected to the second gate line of the first pixel unit, the third source is electrically connected to the data line, and the third drain is electrically connected to the third pixel electrode. The charge sharing unit is electrically connected to the first gate line of the second pixel unit and the second drain of the second switching element of the second sub-pixel of the first pixel unit. The patterned phase retarding device is disposed on the display panel. The patterned phase retarding device includes a first phase retardation pattern and a second phase retardation pattern. The first phase retardation pattern corresponds to the first pixel unit, and the second phase retardation pattern corresponds to the second pixel unit. The display driving method includes the following steps. In a first period, the first gate signal is input into the first gate line of the first pixel unit and the data signal is input into the data line so as to write a first sub-pixel voltage in the first sub-pixel of the first pixel unit and write the second sub-pixel voltage in the second sub-pixel of the first pixel unit. In a second period, the second gate signal is input into the second gate line of the first pixel unit and the data signal is input into the data line so as to write a third sub-pixel voltage in the third sub-pixel of the first pixel unit. The second period lags behind and partially overlaps the first period. In a third period, the first gate signal is input into the first gate line of the second pixel unit and the data signal is input into the data line so as to write another first sub-pixel voltage in the first sub-pixel of the second pixel unit and the second sub-pixel of the second pixel unit. Moreover, the charge sharing unit of the first pixel unit shares charges with the second sub-pixel of the first pixel unit owing to the first gate signal so as to make the second sub-pixel voltage of the first pixel unit different from the first sub-pixel voltage of the first pixel unit. The third period lags behind and partially overlaps the second period.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, the embodiments will be made in detail. The embodiments of the present invention are illustrated in the accompanying drawings with numbered elements. In addition, the terms such as "first" and "second" described in the present invention are used to distinguish different components or processes, which do not limit the sequence of the components or processes.

Figure 1:
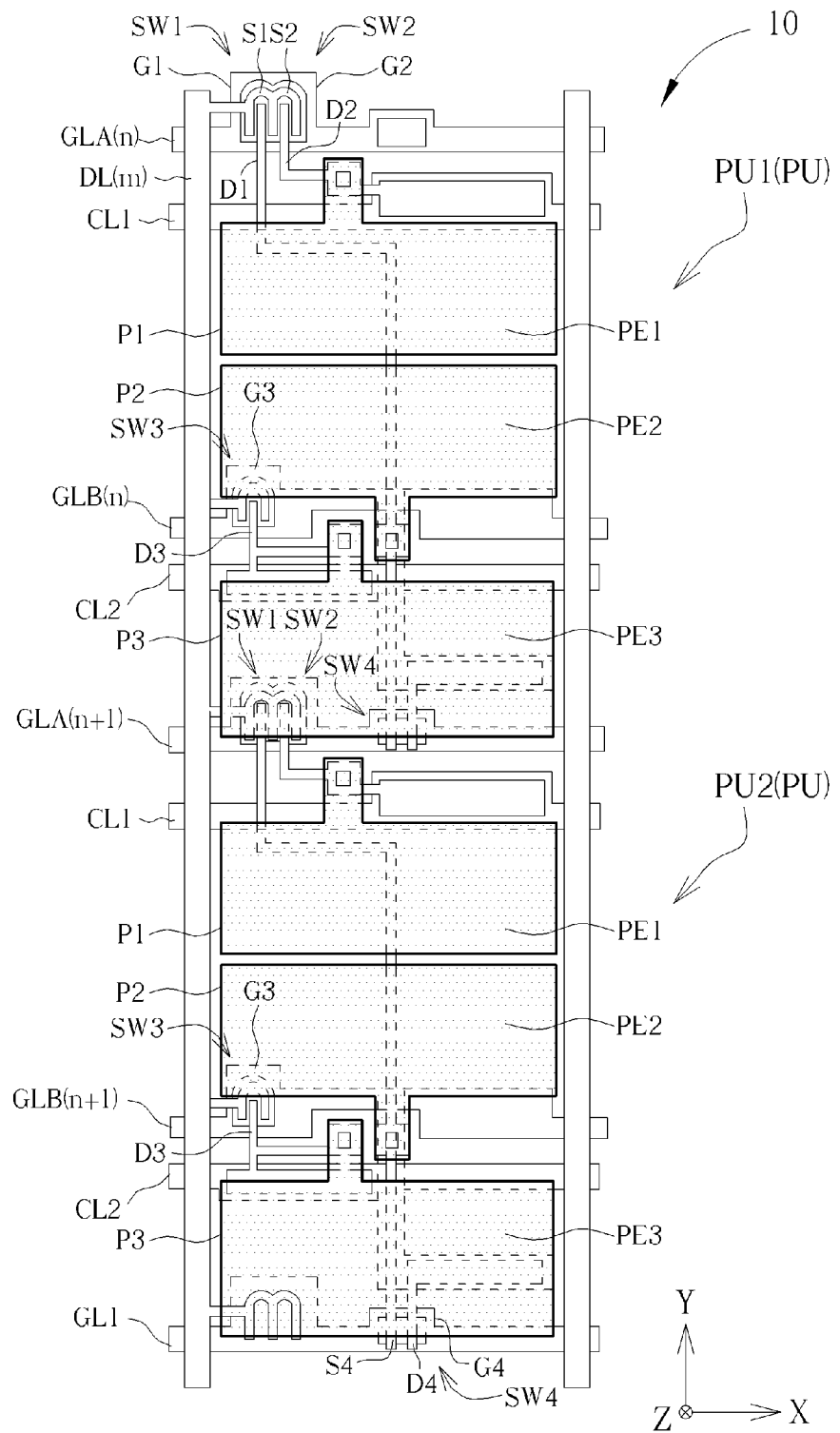
FIG. 1 is a schematic diagram illustrating a pixel structure according to an embodiment of the present invention.
Figure 2:
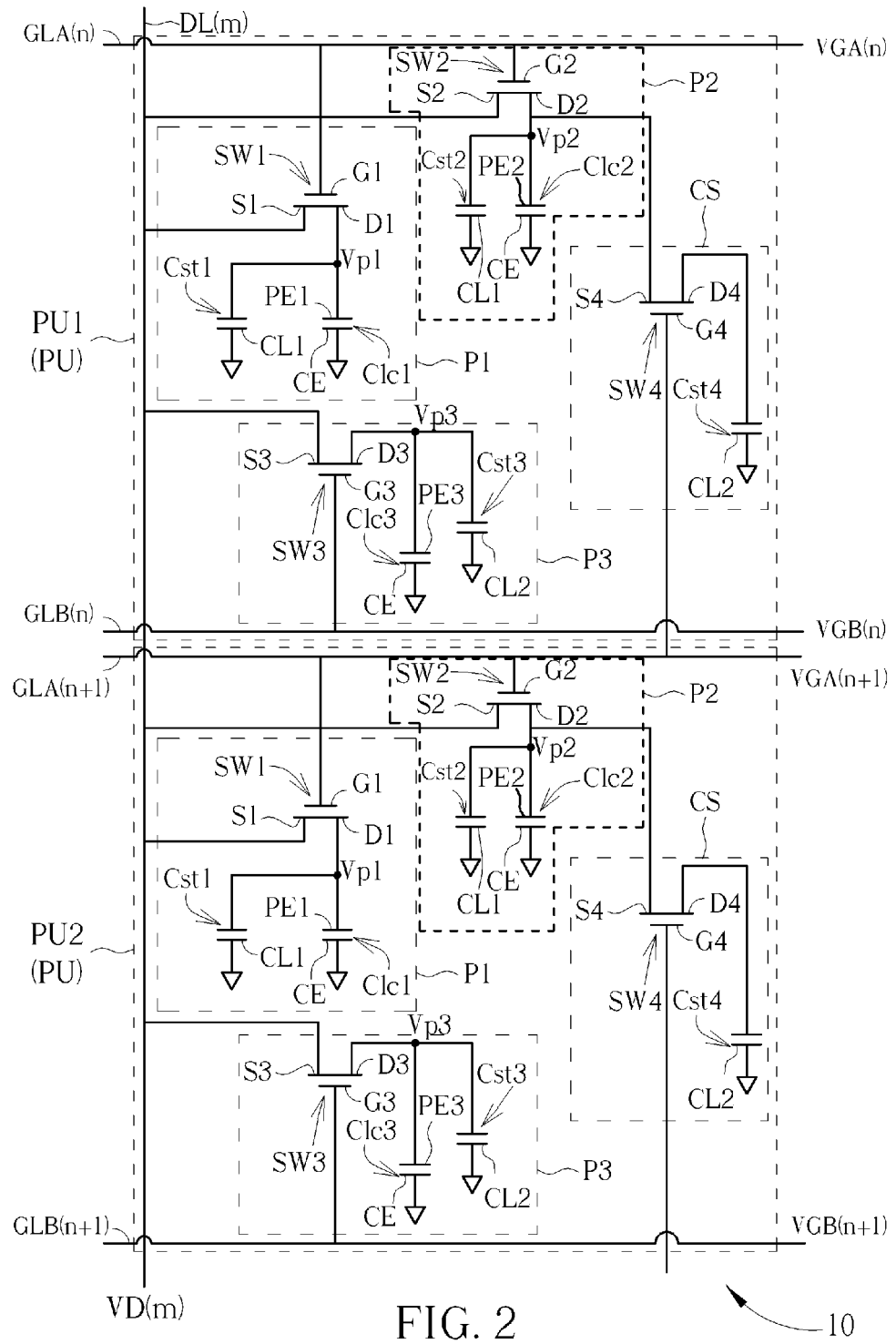
FIG. 2 is an equivalent circuit diagram of a pixel circuit of the pixel structure in FIG. 1.

Please refer to FIGS. 1-2. FIG. 1 is a schematic diagram illustrating a pixel structure according to an embodiment of the present invention. FIG. 2 is an equivalent circuit diagram of a pixel circuit of the pixel structure in FIG. 1. The pixel structure in this embodiment is suitable for a 2D and 3D switchable display device, such as a 2D and 3D switchable liquid crystal display device, but not limited thereto. The pixel structure in this embodiment may be also suitable for other kinds of 2D and 3D switchable display devices, such as a 2D and 3D switchable liquid crystal display device or a 2D and 3D switchable organic electroluminescent display device. As shown in FIGS. 1-2, the pixel structure 10 in this embodiment includes a plurality of pixel units PU arranged in an array. The pixel units PU include at least one first pixel unit PU1 and a second pixel unit PU2 adjacent to each other. In this embodiment, a plurality of pixel units PU can constitute a display pixel unit. For example, three pixel units PU for displaying different colors can constitute a display pixel unit to display a full color image. The first pixel unit PU1 includes a data line DL(m), a first gate line GLA(n), a second gate line GLB(n), a first sub-pixel P1, a second sub-pixel P2, a third sub-pixel P3, and a charge sharing unit CS. The second pixel unit PU2 includes a data line DL(m), a first gate line GLA(n), a second gate line GLB(n), a first sub-pixel P1, a second sub-pixel P2, a third sub-pixel P3, and a charge sharing unit CS. The first pixel unit PU1 and the second pixel unit PU2 share the data line DL(m) for transmitting the data signals VD(m). The data line DL(m) may be disposed along a direction Y. The first gate lines GLA(n) and GLA(n+1) are used to transmit the first gate signals VGA(n) and VGA(n+1) respectively. The second gate lines GLB(n) and GLB(n+1) are substantially parallelly disposed along a direction X. The second gate lines GLB(n) and GLB(n+1) are used to transmit the second gate signals VGB(n) and VGB(n+1) respectively. The first sub-pixel P1 includes a first switching element SW1 and a first pixel electrode PE1. The first switching element SW1 may include, for example, a first gate G1, a first source S1, and a first drain D1. The first gate G1 may, for example, electrically connect the first gate line GLA(n) of the first pixel unit PU1. The first source S1 may, for example, electrically connect the data line DL(m). The first drain D1 may, for example, electrically connect the first pixel electrode PE1. A first liquid crystal capacitor Clc1 may be formed between the first pixel electrode PE1 and a common electrode CE (not shown in FIG. 1) on the substrate or another substrate so as to drive the liquid crystals in-between—since it is well known by a person of ordinary skill in the art, it will not be redundantly described herein. The second sub-pixel P2 includes a second switching element SW2 and a second pixel electrode PE2. The second switching element SW2 may include, for example, a second gate G2, a second source S2, and a second drain D2. The second gate G2 may, for example, electrically connect the first gate line GLA(n) of the first pixel unit PU1. The second source S2 may, for example, electrically connect the data line DL(m). The second drain D2 may, for example, electrically connect the second pixel electrode PE2. A second liquid crystal capacitor Clc2 may be formed between the second pixel electrode PE2 and a common electrode CE so as to drive the liquid crystals in between. The third sub-pixel P3 includes a third switching element SW3 and a third pixel electrode PE3. The third switching element SW3 may include, for example, a third gate G3, a third source S3, and a third drain D3. The third gate G3 may, for example, electrically connect the second gate line GLB(n) of the first pixel unit PU1. The third source S3 may, for example, electrically connect the data line DL(m). The third drain D3 may, for example, electrically connect the third pixel electrode PE3. A third liquid crystal capacitor Clc3 may be formed between the third pixel electrode PE3 and a common electrode CE so as to drive the liquid crystals in between. In this embodiment, the second sub-pixel P2 locates between the first sub-pixel P1 and the third sub-pixel P3, but the present invention is not limited to this. The scale and dimension of the first sub-pixel P1, the second sub-pixel P2 and the third sub-pixel P3 may be the same or be further modified according to other considerations. The charge sharing unit CS of the first pixel unit PU1 is electrically connected to the first gate line GLA(n+1) of the second pixel unit PU2 and the second drain D2 of the second switching element SW2 of the second sub-pixel P2 of the first pixel unit PU1. The charge sharing unit CS includes a fourth switching element SW4. The fourth switching element SW4 includes a fourth gate G4, a fourth source S4, and a fourth drain D4. The fourth gate G4 is electrically connected to the first gate line GLA(n) of the second pixel unit PU2. The fourth source S4 is electrically connected to the second drain D2 of the second switching element SW2 of the second sub-pixel P2 of the first pixel unit PU1. The fourth drain D4 is, for example, floating. The fourth drain D4 may be disposed under the third sub-pixel P3. In this embodiment, the first switching element SW1, the second switching element SW2, the third switching element SW3 and the fourth switching element SW4 may be accomplished with thin film transistor devices, but not limited thereto. Moreover, the pixel structure 10 further includes a first common line CL1 and a second common line CL2. The first drain D1 partially overlaps the first common line CL1 to form a first storage capacitor Cst1. The second drain D2 partially overlaps the first common line CL1 to form a second storage capacitor Cst2. The third drain D3 partially overlaps the second common line CL2 to form a third storage capacitor Cst3. The fourth drain D4 partially overlaps the second common line CL2 to form a fourth storage capacitor Cst4.

In this embodiment, the first gate signal VGA(n) of the first sub-pixel P1 and the data signal VD(m) are generated according to a first Gamma curve. The first gate signal VGA(n) is input into the first gate G1. The data signal VD(m) is input into the first source S1 so as to write a first sub-pixel voltage Vp1 in the first sub-pixel P1. The first gate signal VGA(n) is input into the second gate G2. The data signal VD(m) is input into the second source S2 so as to write a second sub-pixel voltage Vp2 in the second sub-pixel P2. The second gate signal VGB(n) of the third sub-pixel P3 and the data signal VD(m) are generated according to a second Gamma curve. The second gate signal VGB(n) is input into the third gate G3. The data signal VD(m) is input into the third source S3 so as to write a third sub-pixel voltage Vp3, which is different from the first sub-pixel voltage Vp1 and the second sub-pixel voltage Vp2, in the third sub-pixel P3. Because the charge sharing unit CS is electrically connected to the second sub-pixel P2 of the first pixel unit PU1 and the first gate line GLA(n+1) of the second pixel unit PU2, the charge sharing unit CS of the first pixel unit PU1 will share charges with the second sub-pixel P2 of the first pixel unit PU1 according to the first gate signal VGA(n+1) of the first gate line GLA(n+1) of the second pixel unit PU2 so as to make the second sub-pixel voltage Vp2 different from the first sub-pixel voltage Vp1. Accordingly, the first sub-pixel voltage Vp1 of the first pixel unit PU1, the second sub-pixel voltage Vp2 of the first pixel unit PU1, and the third sub-pixel voltage Vp3 of the first pixel unit PU1 may be different, thereby performing multi-domain vertically alignment to achieve wide viewing angle display functionality. For example, if each sub-pixel has four vertically aligning domains, the first sub-pixel P1, the second sub-pixel P2 and the third sub-pixel P3 of the pixel units PU in this embodiment may achieve twelve-domain vertically alignment. In this embodiment, the 2D and 3D switchable display device displays the image to a viewer 90 toward the z direction.

Figure 3:
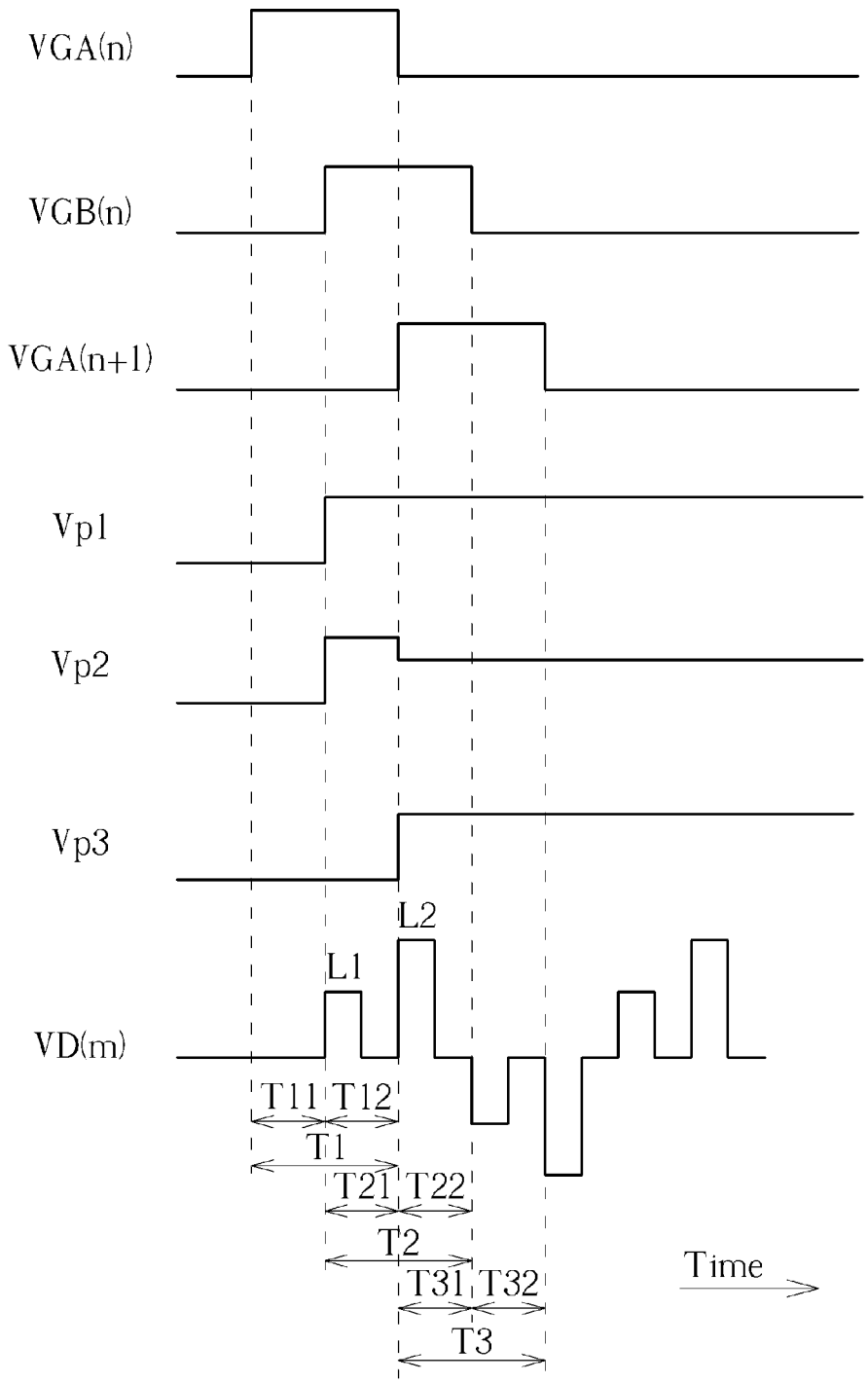
FIG. 3 is a timing schematic diagram illustrating the pixel structure of FIG. 1 in a 2D display mode.

Please refer to FIG. 3, and also refer to FIGS. 1-2. FIG. 3 is a timing schematic diagram illustrating the pixel structure of FIG. 1 in a 2D display mode. As shown in FIG. 3, the display driving method in a 2D display mode in this embodiment includes the following steps. In a first period T1, the first gate signal VGA(n) is input into the first gate line GLA(n) of the first pixel unit PU1 and the data signal VD(m) is input into the data line DL(m) so as to write a first sub-pixel voltage Vp1 in the first sub-pixel P1 of the first pixel unit PU1 and write the second sub-pixel voltage Vp2 in the second sub-pixel P2 of the first pixel unit PU1. The data signal VD(m) has a first level L1 in the first period T1. In a second period T2, the second gate signal VGB(n) is input into the second gate line GLB(n) of the first pixel unit PU1 and the data signal VD(m) is input into the data line DL(m) so as to write a third sub-pixel voltage Vp3 in the third sub-pixel P3 of the first pixel unit PU1. The data signal VD(m) has a second level L2 different from the first level L1 in the second period T2. In a third period T3, the first gate signal VGA(n+1) is input into the first gate line GLA(n+1) of the second pixel unit PU2 and the data signal VD(m) is input into the data line DL(m) so as to write another first sub-pixel voltage Vp1 in the first sub-pixel P1 of the second pixel unit PU2 and the second sub-pixel P2 of the second pixel unit PU2. At the same time, the charge sharing unit CS of the first pixel unit PU1 shares charges with the second sub-pixel P2 of the first pixel unit PU1 owing to the first gate signal VGA(n+1) so as to make the second sub-pixel voltage Vp2 of the first pixel unit PU1 different from the first sub-pixel voltage Vp1 of the first pixel unit PU1. In this embodiment, the second period T2 lags behind and partially overlaps the first period T1; the third period T3 lags behind and partially overlaps the second period T2. More specifically, the first period T1 can be divided into a sub period T11 and a sub period T12. The second period T2 can be divided into a sub period T21 and a sub period T22. The third period T3 can be divided into a sub period T31 and a sub period T32. The sub period T12 overlaps the sub period T21. The sub period T22 overlaps the sub period T31. In the sub period T11, the first sub-pixel P1 of the first pixel unit PU1 and the second sub-pixel P2 of the first pixel unit PU1 may be pre-charged with the first gate signal VGA(n). In the sub period T12 (the sub period T21), the data signal VD(m) transmitted by the data line DL(m) has a first level L1 so as to write a first sub-pixel voltage Vp1 in the first sub-pixel P1 of the first pixel unit PU1 and write the second sub-pixel voltage Vp2 in the second sub-pixel P2 of the first pixel unit PU1. Moreover, the first sub-pixel voltage Vp1 equals the second sub-pixel voltage Vp2 in the sub period T12 (the sub period T21). In the sub period T12 (the sub period T21), the third sub-pixel P3 of the first pixel unit PU1 may be pre-charged with the second gate signal VGB(n). In the sub period T22 (the sub period T31), the data signal VD(m) transmitted by the data line DL(m) has a second level L2 so as to write a third sub-pixel voltage Vp3 in the third sub-pixel P3 of the first pixel unit PU1. In the sub period T22 (the sub period T31), the first sub-pixel P1 of the second pixel unit PU2 and the second sub-pixel P2 of the second pixel unit PU2 may be pre-charged with the first gate signal VGA(n+1). Moreover, in the sub period T22 (the sub period T31), the charge sharing unit CS of the first pixel unit PU1 can share charges with the second sub-pixel P2 of the first pixel unit PU1 owing to the first gate signal VGA(n+1). Therefore, the second sub-pixel voltage Vp2 of the first pixel unit PU1 is different from the first sub-pixel voltage Vp1 of the first pixel unit PU1; moreover, the gray level value of the first sub-pixel P1 and the gray level value of the second sub-pixel P2 are different. According to the display driving method, the first sub-pixel P1, the second sub-pixel P2 and the third sub-pixel P3 may be different, thereby accomplishing multi-domain vertically alignment.

Figure 4:
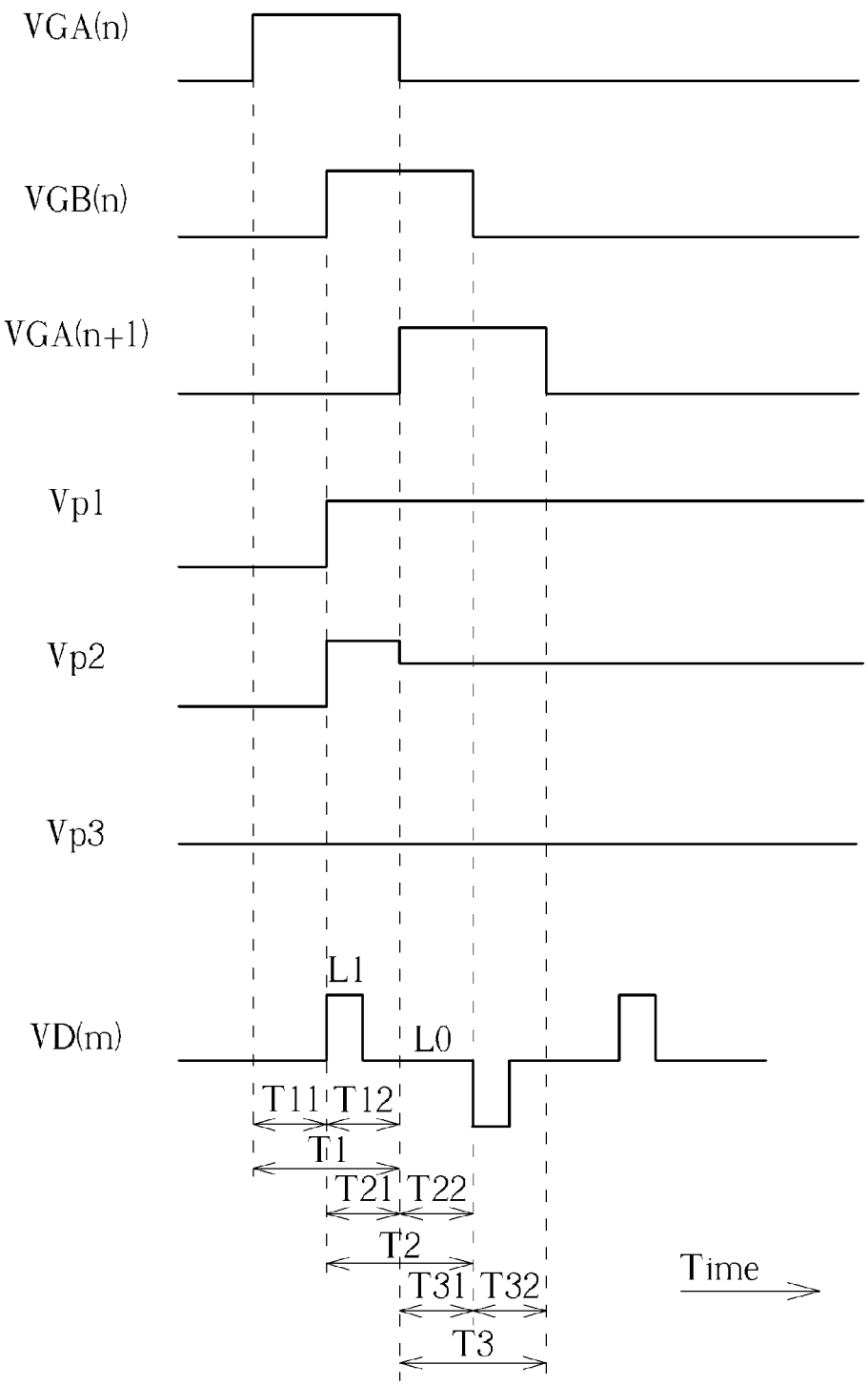
FIG. 4 is a timing schematic diagram illustrating the pixel structure of FIG. 1 in a 3D display mode.

Please refer to FIG. 4, and also refer to FIGS. 1-2. FIG. 4 is a timing schematic diagram illustrating the pixel structure of FIG. 1 in a 3D display mode. As shown in FIG. 4, the display driving method in a 3D display mode in this embodiment is different from the display driving method in a 2D display mode and includes the following steps. In a first period T1, the first gate signal VGA(n) is input into the first gate line GLA(n) of the first pixel unit PU1 and the data signal VD(m) is input into the data line DL(m) so as to write a first sub-pixel voltage Vp1 in the first sub-pixel P1 of the first pixel unit PU1 and write the second sub-pixel voltage Vp2 in the second sub-pixel P2 of the first pixel unit PU1. The data signal VD(m) has a first level L1 in the first period T1. In a second period T2, the second gate signal VGB(n) is input into the second gate line GLB(n) of the first pixel unit PU1 and the data signal VD(m) is input into the data line DL(m) so as to write a third sub-pixel voltage Vp3 in the third sub-pixel P3 of the first pixel unit PU1. In the second period T2, the data signal VD(m) has a zero gray level L0, and thus the third sub-pixel voltage Vp3 is a zero gray level voltage. In a third period T3, the first gate signal VGA(n+1) is input into the first gate line GLA(n+1) of the second pixel unit PU2 and the data signal VD(m) is input into the data line DL(m) so as to write another first sub-pixel voltage Vp1 in the first sub-pixel P1 of the second pixel unit PU2 and the second sub-pixel P2 of the second pixel unit PU2. At the same time, the charge sharing unit CS of the first pixel unit PU1 shares charges with the second sub-pixel P2 of the first pixel unit PU1 owing to the first gate signal VGA(n+1) so as to make the second sub-pixel voltage Vp2 of the first pixel unit PU1 different from the first sub-pixel voltage Vp1 of the first pixel unit PU1. In this embodiment, the second period T2 lags behind and partially overlaps the first period T1; the third period T3 lags behind and partially overlaps the second period T2. More specifically, the first period T1 can be divided into a sub period T11 and a sub period T12. The second period T2 can be divided into a sub period T21 and a sub period T22. The third period T3 can be divided into a sub period T31 and a sub period T32. The sub period T12 overlaps the sub period T21. The sub period T22 overlaps the sub period T31. In the sub period T11, the first sub-pixel P1 of the first pixel unit PU1 and the second sub-pixel P2 of the first pixel unit PU1 may be pre-charged with the first gate signal VGA(n). In the sub period T12 (the sub period T21), the data signal VD(m) transmitted by the data line DL(m) has a first level L1 so as to write a first sub-pixel voltage Vp1 in the first sub-pixel P1 of the first pixel unit PU1 and write the second sub-pixel voltage Vp2 in the second sub-pixel P2 of the first pixel unit PU1. The first sub-pixel voltage Vp1 equals the second sub-pixel voltage Vp2 in the sub period T12 (the sub period T21). In the sub period T12 (the sub period T21), the third sub-pixel P3 of the first pixel unit PU1 may be pre-charged with the second gate signal VGB(n). In the sub period T22 (the sub period T31), the data signal VD(m) transmitted by the data line DL(m) has a zero gray level L0 so as to write a third sub-pixel voltage Vp3 of zero gray level voltage in the third sub-pixel P3 of the first pixel unit PU1. Therefore, the third sub-pixel P3 is in dark state so as to serve as shielding patterns. In the sub period T22 (the sub period T31), the first sub-pixel P1 of the second pixel unit PU2 and the second sub-pixel P2 of the second pixel unit PU2 may be pre-charged with the first gate signal VGA(n+1). Moreover, in the sub period T22 (the sub period T31), the charge sharing unit CS of the first pixel unit PU1 can share charges with the second sub-pixel P2 of the first pixel unit PU1 owing to the first gate signal VGA(n+1). Therefore, the second sub-pixel voltage Vp2 of the first pixel unit PU1 is different from the first sub-pixel voltage Vp1 of the first pixel unit PU1; moreover, the gray level value of the first sub-pixel P1 and the gray level value of the second sub-pixel P2 are different.

Accordingly, the third sub-pixel voltage Vp3 is different from the first sub-pixel voltage Vp1 because the first sub-pixel P1 and the third sub-pixel P3 of each of the pixel units PU of the pixel structure 10 in this embodiment are driven by the first gate line and the second gate line respectively. The second sub-pixel voltage Vp2 is different from the first sub-pixel voltage Vp1 and the third sub-pixel voltage Vp3 because the second sub-pixel P2 shares charges with the first gate line of the adjacent pixel unit PU. In the 2D display mode, the pixel structure 10 can perform multi-domain vertically alignment to achieve wide viewing angle display functionality. Moreover, because the timing of the periods of the gate signals of the first gate lines of the adjacent pixel units PU do not mutually overlap, the pre-charging driving method can be applied. In the 3D display mode, the first sub-pixel voltage Vp1 does not equal the second sub-pixel voltage Vp2, thereby performing multi-domain vertically alignment to achieve wide viewing angle display functionality. Moreover, the third sub-pixel voltage Vp3 is preferably a zero gray level voltage, and thus the third sub-pixel P3 is in dark state. In this condition, the third sub-pixels P3 can serve as shielding patterns between the adjacent pixel units, which are used to display the frames of a left eye and the frames of a right eye. Therefore, it prevents cross talk issues, caused by the frames of the left eye and the frames of the right eye, at the edge of the images. Because the pixel structure 10 of this embodiment is a 2G1D structure—that is to say, all of the three sub-pixels have different sub-pixel voltages with only two gate lines and one data line—the opening rate increases.

Figure 5:
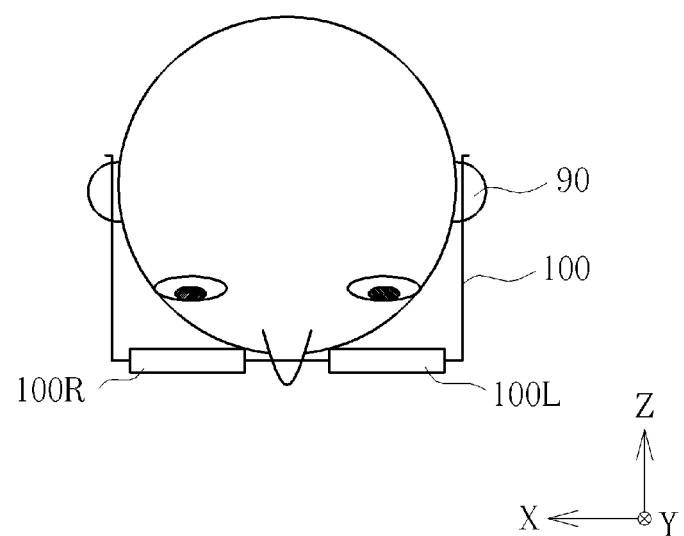
FIG. 5 is a schematic diagram illustrating a top view of a 2D and 3D switchable display device 50 according to an embodiment of the present invention.
Figure 5:
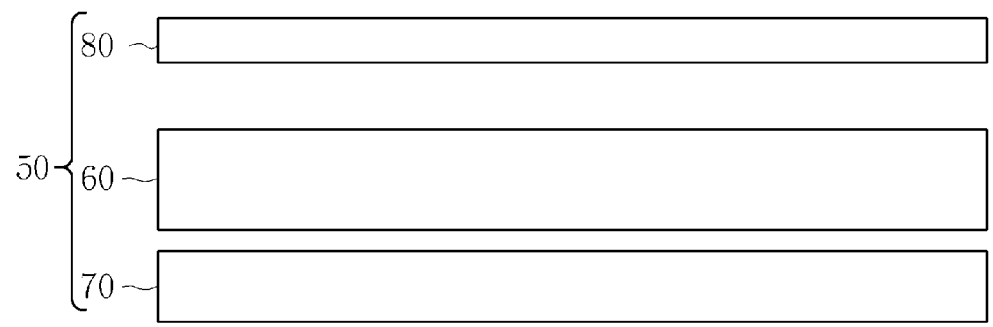
Figure 6:
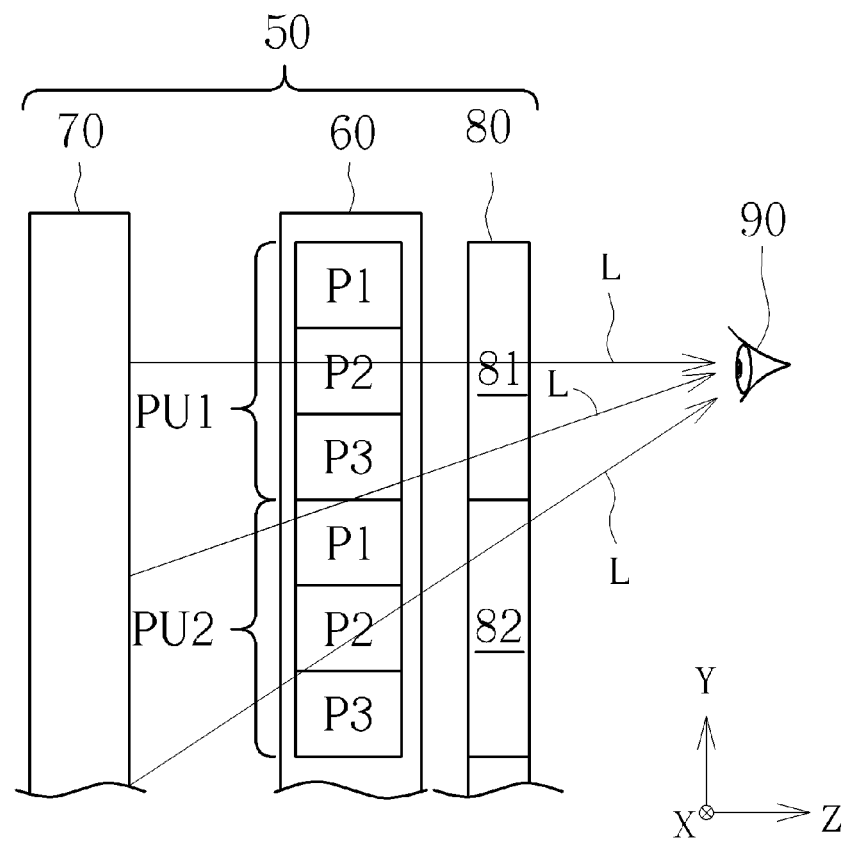
FIG. 6 is a schematic diagram illustrating a side view of a 2D and 3D switchable display device in FIG. 5 in the 2D display mode.
Figure 7:
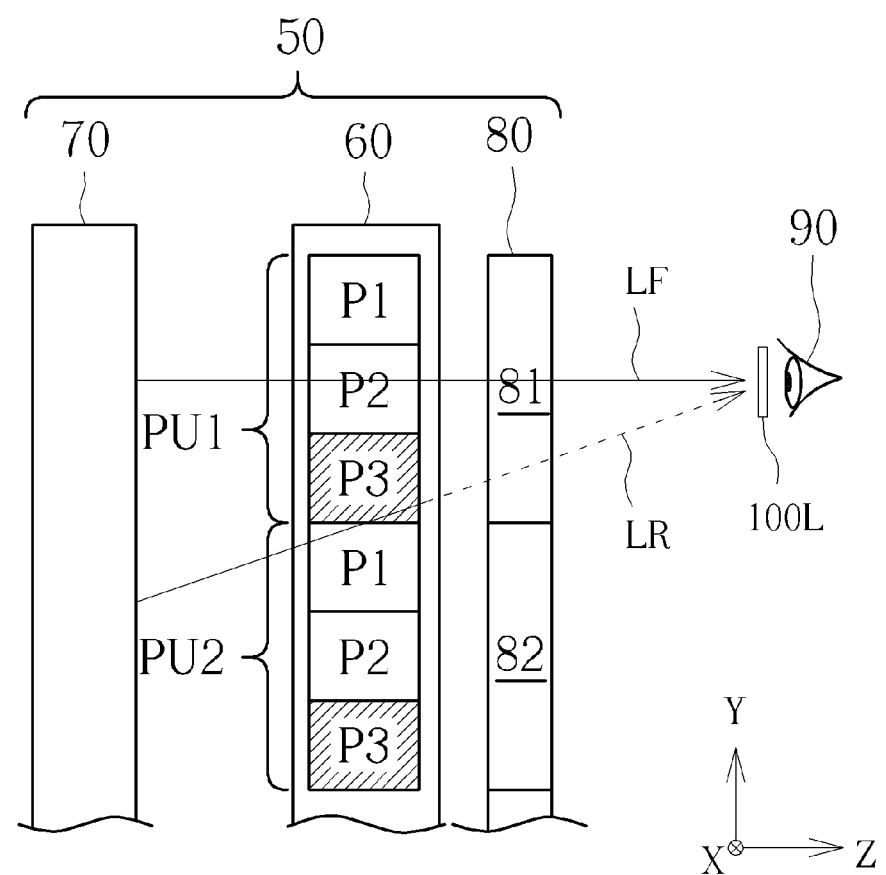
FIG. 7 is a schematic diagram illustrating a side view of a 2D and 3D switchable display device in FIG. 5 in the 3D display mode.

Please refer to FIGS. 5-7. FIG. 5 is a schematic diagram illustrating a top view of a 2D and 3D switchable display device 50 according to an embodiment of the present invention. FIG. 6 is a schematic diagram illustrating a side view of a 2D and 3D switchable display device in FIG. 5 in the 2D display mode. FIG. 7 is a schematic diagram illustrating a side view of a 2D and 3D switchable display device in FIG. 5 in the 3D display mode. As shown in FIG. 5, the 2D and 3D switchable display device in this embodiment includes a backlight module 70, a patterned phase retarding device 80, and a display panel 60, such as a liquid crystal display panel. The backlight module 70 is disposed in the back of the display panel 60. The patterned phase retarding device 80 is disposed on the display panel 60. In other words, the display panel 60 is disposed between the patterned phase retarding device 80 and the backlight module 70. The display panel 60 includes a plurality of pixel units. The structure and the display driving method of the pixel units are disclosed as the above-mentioned embodiments and will not be redundantly described. The display panel 60 is not restricted to a liquid crystal display panel. As shown in FIGS. 6-7, the patterned phase retarding device 80 includes a first phase retardation pattern 81 and a second phase retardation pattern 82. The first phase retardation pattern 81 corresponds to the first pixel unit PU1, and the second phase retardation pattern 82 corresponds to the second pixel unit PU2. The patterned phase retarding device 80 may be a patterned retardation film or a liquid crystal retardation device, but not limited thereto—since it is well known by a person of ordinary skill in the art, it will not be redundantly described. As shown in FIG. 6, in the 2D display mode, because the same data signal VD(m) may be preferably input in the first pixel unit PU1 and the second pixel unit PU2, the viewer 90 sees the same frame in both the right eye and the left eye at the same time, but not limited thereto. Because the frames in both of the viewer's 90 right eye and left eye are the same, the viewer 90 only sees a 2D image whether the first phase retardation pattern 81 and the second phase retardation pattern 82 have the same phase retardation effect or not and whether the viewer 90 wears glasses or not. As shown in FIG. 7, in the 3D display mode, because the first phase retardation pattern 81 and the second phase retardation pattern 82 have different phase retardation effects—for example, the first phase retardation pattern 81 is in a one-half wavelength retardation mode and the second phased retardation pattern is in a zero wavelength retardation mode—the frame LF for the left eye provided by the first pixel unit PU1 and the frame LR for the right eye provided by the second pixel unit PU2 have different polarization directions. In the 3D display mode, different data signals VD(m) are input in the first pixel unit PU1 and the second pixel unit PU2, and the different data signals VD(m) correspond to the frame data of the left eye and of the right eye, respectively. The viewer 90 has to wear polarizer glasses 100. The left lens 100L of the polarizer glasses 100 corresponds to, for example, the first pixel unit PU1, and the left lens 100L of the polarizer glasses 100 only allows the frame LF for the left eye to pass through so that the left eye only sees the frame LF for the left eye. The right lens 100R of the polarizer glasses 100 corresponds to, for example, the second pixel unit PU2, and the right lens 100R of the polarizer glasses 100 only allows the frame LR for the right eye to pass through so that the right eye only sees the frame LR for the right eye. Accordingly, the viewer 90 can see the stereoscopic effect. It is worth noting that because the viewing angles are different, a portion of the frame LR for the right eye may bleed from the first phase retardation pattern 81 and has the same polarization direction as that of the frame LF for the left eye. Therefore, the portion of the frame LR for the right eye can pass through the left lens 100L of the polarizer glasses 100. Similarly, a portion of the frame LF for the left eye may bleed from the second phase retardation pattern 82 and has the same polarization direction as that of the frame LR for the right eye. Therefore, the portion of the frame LF for the left eye can pass through the right lens 100R of the polarizer glasses 100. As a result, the frame LF for the left eye and the frame LR for the right eye may cause cross talk issues at the edge of the images and decrease 3D display quality. Accordingly, in the 3D display mode, the third sub-pixel P3 of the first pixel unit PU1 and the third sub-pixel P3 of the second pixel unit PU2 of the 2D and 3D switchable display device in this embodiment are preferably controlled in dark state. For example, zero gray level image data is input into data line DL(m), thereby displaying the third sub-pixel P3 as black images to serve as shielding patterns. Because the shielding patterns can prevent the frame LR for the right eye from breeding from the first phase retardation pattern 81, the frame LR for the right eye may not pass through the left lens 100L and the frame LR for the right eye would not be received by the left eye as the illustration shown by the arrow in FIG. 7. At the same time, because the shielding patterns also prevent the frame LF for the left eye from breeding from the second phase retardation pattern 82, the frame LF for the left eye may not pass through the right lens 100R and the frame LF for the left eye would not be received by the right eye (not shown). Therefore, the cross talk issues, caused by the frames LF of the left eye and the frames LR of the right eye, at the edge of the images in the Y direction can be effectively avoided. Moreover, in the 3D display mode, because the first sub-pixel voltage Vp1 does not equal the second sub-pixel voltage Vp2, multi-domain vertically alignment can be performed to achieve wide viewing angle display functionality, avoid color wash-out and enhance the quality of display performance.

To sum up, in the present invention, the third sub-pixel voltage is different from the first sub-pixel voltage because the first sub-pixel and the third sub-pixel of each of the pixel units of the pixel structure in this embodiment are driven by the first gate line and the second gate line respectively. The second sub-pixel voltage is different from the first sub-pixel voltage and the third sub-pixel voltage because the second sub-pixel shares charges with the first gate line of the adjacent pixel unit. In both the 2D display mode and the 3D display mode, the pixel structure can perform multi-domain vertically alignment to achieve wide viewing angle display functionality. Moreover, because the timing of the periods of the gate signals of the first gate lines of the adjacent pixel units do not mutually overlap, the pre-charging driving method can be applied. In the 3D display mode, the first sub-pixel voltage does not equal the second sub-pixel voltage, thereby performing multi-domain vertically alignment to achieve wide viewing angle display functionality with higher brightness and saturation. Accordingly, Moreover, the third sub-pixel voltage is preferably a zero gray level voltage, and thus the third sub-pixel is in dark state. In this condition, the third sub-pixels can serve as shielding patterns between the adjacent pixel units, which are used to display the frames of the left eye and the frames of the right eye. Therefore, it prevents cross talk issues, caused by the frames of the left eye and the frames of the right eye, at the edge of the images. Because the pixel structures of these embodiments are 2G1D structures—that is to say, all of the three sub-pixels have different sub-pixel voltages with only two gate lines and one data line—the opening rate increases.

Those skilled in the art will readily observe that numerous modifications and alterations of the device and method may be made while retaining the teachings of the invention. Accordingly, the above invention should be construed as limited only by the metes and bounds of the appended claims.

What is claimed is:

1. A pixel structure, adapted to a two-dimension (2D) and three-dimension (3D) switchable display device, the pixel structure comprising:
   a plurality of pixel units, comprising a first pixel unit and a second pixel unit adjacent to each other, wherein each of the pixel units comprises:
   a data line, configured to transmit a data signal;
   a first gate line, configured to transmit a first gate signal;
   a second gate line, configured to transmit a second gate signal;
   a first sub-pixel, comprising:
      a first switching element, comprising a first gate, a first source, and a first drain; and
      a first pixel electrode, wherein the first gate is electrically connected to the first gate line of the first pixel unit, the first source is electrically connected to the data line, and the first drain is electrically connected to the first pixel electrode;
   a second sub-pixel, comprising:
      a second switching element, comprising a second gate, a second source, and a second drain; and
      a second pixel electrode, wherein the second gate is electrically connected to the first gate line of the first pixel unit, the second source is electrically connected to the data line, and the second drain is electrically connected to the second pixel electrode;
   a third sub-pixel, comprising:
      a third switching element, comprising a third gate, a third source, and a third drain; and
      a third pixel electrode, wherein the third gate is electrically connected to the second gate line of the first pixel unit, the third source is electrically connected to the data line, and the third drain is electrically connected to the third pixel electrode; and
   a charge sharing unit, electrically connected to the first gate line of the second pixel unit and the second drain of the second switching element of the second sub-pixel of the first pixel unit, wherein the charge sharing unit comprises a fourth switching element, and the fourth switching element comprises:
      a fourth gate, electrically connected to the first gate line of the second pixel unit;
      a fourth source, electrically connected to the second drain of the second switching element of the second sub-pixel of the first pixel unit; and
      a fourth drain, wherein the fourth drain is floating; and
   a first common line and a second common line, wherein the first drain partially overlaps the first common line to form a first storage capacitor, the second drain partially overlaps the first common line to form a second storage capacitor, the third drain partially overlaps the second common line to form a third storage capacitor, and the fourth drain partially overlaps the second common line to form a fourth storage capacitor.

2. The pixel structure according to claim 1, wherein the second sub-pixel locates between the first sub-pixel and the third sub-pixel.

3. The pixel structure according to claim 1, wherein the first gate signal of the first sub-pixel and the data signal are generated according to a first Gamma curve, and the second gate signal of the third sub-pixel and the data signal are generated according to a second Gamma curve.

4. A two-dimension (2D) and three-dimension (3D) switchable display device, comprising:
   a display panel, comprising a plurality of pixel units, wherein the pixel units comprise a first pixel unit and a second pixel unit adjacent to each other, and each of the pixel units comprises:
   a data line, configured to transmit a data signal;
   a first gate line, configured to transmit a first gate signal;
   a second gate line, configured to transmit a second gate signal;
   a first sub-pixel, comprising:
      a first switching element, comprising a first gate, a first source, and a first drain; and
      a first pixel electrode, wherein the first gate is electrically connected to the first gate line of the first pixel unit, the first source is electrically connected to the data line, and the first drain is electrically connected to the first pixel electrode;
   a second sub-pixel, comprising:
      a second switching element, comprising a second gate, a second source, and a second drain; and
      a second pixel electrode, wherein the second gate is electrically connected to the first gate line of the first pixel unit, the second source is electrically connected to the data line, and the second drain is electrically connected to the second pixel electrode;
   a third sub-pixel, comprising:
      a third switching element, comprising a third gate, a third source, and a third drain; and
      a third pixel electrode, wherein the third gate is electrically connected to the second gate line of the first pixel unit, the third source is electrically connected to the data line, and the third drain is electrically connected to the third pixel electrode;
   a charge sharing unit, electrically connected to the first gate line of the second pixel unit and the second drain of the second switching element of the second sub-pixel of the first pixel unit, wherein the charge sharing unit comprises a fourth switching element, and the fourth switching element comprises:
      a fourth gate, electrically connected to the first gate line of the second pixel unit;
      a fourth source, electrically connected to the second drain of the second switching element of the second sub-pixel of the first pixel unit; and
      a fourth drain, wherein the fourth drain is floating; and
   a first common line and a second common line, wherein the first drain partially overlaps the first common line to form a first storage capacitor, the second drain partially overlaps the first common line to form a second storage capacitor, the third drain partially overlaps the second common line to form a third storage capacitor, and the fourth drain partially overlaps the second common line to form a fourth storage capacitor; and a patterned phase retarding device, disposed on the display panel, wherein the patterned phase retarding device comprises a first phase retardation pattern and a second phase retardation pattern, the first phase retardation pattern corresponds to the first pixel unit, and the second phase retardation pattern corresponds to the second pixel unit.

5. The 2D and 3D switchable display device according to claim 4, wherein the second sub-pixel locates between the first sub-pixel and the third sub-pixel.

6. The 2D and 3D switchable display device according to claim 4, wherein the display panel comprises a liquid crystal display panel.

7. The 2D and 3D switchable display device according to claim 6, further comprising a backlight module, wherein the liquid crystal display panel is disposed between the patterned phase retarding device and the backlight module.

8. A display driving method, adapted to a two-dimension (2D) and three-dimension (3D) switchable display device, the 2D and 3D switchable display device comprising:

a display panel, comprising a pixel structure, wherein the pixel structure comprises a plurality of pixel units, the pixel units comprise a first pixel unit and a second pixel unit adjacent to each other, and each of the pixel units comprises:

a data line, configured to transmit a data signal;
a first gate line, configured to transmit a first gate signal;
a second gate line, configured to transmit a second gate signal;
a first sub-pixel, comprising:
    a first switching element, comprising a first gate, a first source, and a first drain; and
    a first pixel electrode, wherein the first gate is electrically connected to the first gate line of the first pixel unit, the first source is electrically connected to the data line, and the first drain is electrically connected to the first pixel electrode;
a second sub-pixel, comprising:
    a second switching element, comprising a second gate, a second source, and a second drain; and
    a second pixel electrode, wherein the second gate is electrically connected to the first gate line of the first pixel unit, the second source is electrically connected to the data line, and the second drain is electrically connected to the second pixel electrode;
a third sub-pixel, comprising:
    a third switching element, comprising a third gate, a third source, and a third drain; and
    a third pixel electrode, wherein the third gate is electrically connected to the second gate line of the first pixel unit, the third source is electrically connected to the data line, and the third drain is electrically connected to the third pixel electrode; and
a charge sharing unit, electrically connected to the first gate line of the second pixel unit and the second drain of the second switching element of the second sub-pixel of the first pixel unit; and
a patterned phase retarding device, disposed on the display panel, wherein the patterned phase retarding device comprises a first phase retardation pattern and a second phase retardation pattern, the first phase retardation pattern corresponds to the first pixel unit, and the second phase retardation pattern corresponds to the second pixel unit; and the display driving method comprising:
    inputting the first gate signal into the first gate line of the first pixel unit and inputting the data signal into the data line in a first period to write a first sub-pixel voltage in the first sub-pixel of the first pixel unit and write the second sub-pixel voltage in the second sub-pixel of the first pixel unit;
    inputting the second gate signal into the second gate line of the first pixel unit and inputting the data signal into the data line in a second period to write a third sub-pixel voltage in the third sub-pixel of the first pixel unit, wherein the second period lags behind and partially overlaps the first period; and
    inputting the first gate signal into the first gate line of the second pixel unit and inputting the data signal into the data line in a third period to write another first sub-pixel voltage in the first sub-pixel of the second pixel unit and the second sub-pixel of the second pixel unit, wherein the charge sharing unit of the first pixel unit shares charges with the second sub-pixel of the first pixel unit owing to the first gate signal so as to make the second sub-pixel voltage of the first pixel unit different from the first sub-pixel voltage of the first pixel unit, and the third period lags behind and partially overlaps the second period.

9. The display driving method according to claim 8, wherein the data signal has a first level in a 2D display mode in the first period, the data signal has a second level different from the first level in a 2D display mode in the second period, the data signal has a first level in a 3D display mode in the first period, and the data signal has a zero gray level in a 3D display mode in the second period.

10. The display driving method according to claim 9, wherein the same data signal is written into the first pixel unit and the second pixel unit in the 2D display mode.

11. The display driving method according to claim 9, wherein different data signals are written into the first pixel unit and the second pixel unit in the 3D display mode.

* * * * *